United States Patent
Li et al.

(10) Patent No.: US 10,004,084 B2
(45) Date of Patent: Jun. 19, 2018

(54) METHODS AND APPARATUSES FOR COORDINATING RESOURCE SCHEDULING BETWEEN WIRELESS NETWORKS

(71) Applicant: Telefonaktiebolaget LM Ericsson (publ), Stockholm (SE)

(72) Inventors: Gen Li, Beijing (CN); Tim Irnich, Neuss (DE); Cong Shi, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 152 days.

(21) Appl. No.: 15/111,171

(22) PCT Filed: Jan. 21, 2014

(86) PCT No.: PCT/CN2014/070997
§ 371 (c)(1),
(2) Date: Jul. 12, 2016

(87) PCT Pub. No.: WO2015/109439
PCT Pub. Date: Jul. 30, 2015

(65) Prior Publication Data
US 2016/0338083 A1    Nov. 17, 2016

(51) Int. Cl.
*H04W 72/12* (2009.01)
*H04W 16/10* (2009.01)
(Continued)

(52) U.S. Cl.
CPC ....... *H04W 72/1215* (2013.01); *H04W 16/10* (2013.01); *H04W 16/14* (2013.01); *H04W 72/082* (2013.01)

(58) Field of Classification Search
None
See application file for complete search history.

(56) References Cited

U.S. PATENT DOCUMENTS

2010/0267408 A1* 10/2010 Lee .................. H04W 52/243
455/509
2010/0309869 A1    12/2010 Kim et al.
(Continued)

FOREIGN PATENT DOCUMENTS

CA         2848413 A1    4/2013
CN      101296475 A    10/2008
(Continued)

OTHER PUBLICATIONS

Aydin, Osman et al., "Deliverable D4.1: Summary on preliminary trade-off investigations and first set of potential network-level solutions," Document No. ICT-317669, Project Name: Mobile and wireless communications Enablers for the Twenty-twenty Information Society (METIS), Version: 1, delivered Sep. 30, 2013, METIS 2020 Project, 97 pages.
(Continued)

*Primary Examiner* — Anh Ngoc M Nguyen
(74) *Attorney, Agent, or Firm* — Withrow & Terranova, PLLC

(57) ABSTRACT

Methods and apparatuses for coordinating resource scheduling between wireless networks are provided. The method comprises detecting whether interference on at least one interfered wireless link in the wireless network caused by at least one interfering wireless link in at least one second wireless network exceeds a pre-determined threshold. The method also comprises initiating a resource coordination procedure with the at least one second wireless network by transmitting a resource coordination message to the at least one second wireless network when the interference exceeds the pre-determined threshold. The method further comprises performing, based on the resource coordination message, the resource coordination procedure with the at least one second wireless network to determine schedulable resources. The method additionally comprises scheduling the at least one
(Continued)

interfered wireless link based on the determined schedulable resources.

20 Claims, 12 Drawing Sheets

(51) Int. Cl.
*H04W 16/14* (2009.01)
*H04W 72/08* (2009.01)

(56) References Cited

U.S. PATENT DOCUMENTS

| | | | |
|---|---|---|---|
| 2010/0329113 A1 | 12/2010 | Madan et al. | |
| 2012/0236731 A1* | 9/2012 | Beaudin | H04W 72/082 370/248 |
| 2013/0308524 A1 | 11/2013 | Tavildar et al. | |
| 2013/0322374 A1 | 12/2013 | Cai et al. | |
| 2014/0226504 A1* | 8/2014 | Tavildar | H04W 72/082 370/252 |
| 2015/0031284 A1 | 1/2015 | Pitakdumrongkija et al. | |

FOREIGN PATENT DOCUMENTS

| | | | |
|---|---|---|---|
| CN | 102026275 A | 4/2011 | |
| CN | 102438271 A | 5/2012 | |
| CN | 102484575 A | 5/2012 | |
| CN | 102573039 A | 7/2012 | |
| CN | 102833760 A | 12/2012 | |
| CN | 103202056 A | 7/2013 | |
| EP | 2040503 A1 * | 3/2009 | ........... H04L 1/0027 |
| EP | 2663112 A1 | 11/2013 | |
| EP | 2675225 A1 | 12/2013 | |
| WO | 2011020062 A2 | 2/2011 | |
| WO | 2011119750 A1 | 9/2011 | |
| WO | 2013127310 A1 | 9/2012 | |
| WO | 2014047838 A1 | 4/2014 | |
| WO | 2015109441 A1 | 7/2015 | |
| WO | 2015154363 A1 | 10/2015 | |

OTHER PUBLICATIONS

Extended European Search Report for European Patent Application No. 14880271.3, dated Sep. 26, 2017, 6 pages.
International Preliminary Report on Patentability for International Patent Application No. PCT/CN2014/070999, dated Aug. 4, 2016, 6 pages.
Extended European Search Report for European Patent Application No. 14880358.8, dated Sep. 26, 2017, 8 pages.
International Preliminary Report on Patentability for International Patent Application No. PCT/CN2014/070997, dated Aug. 4, 2016, 6 pages.
International Preliminary Report on Patentability for International Patent Application No. PCT/CN2014/084640, dated Oct. 20, 2016, 6 pages.
Klotz, Walter, "Graph Coloring Algorithms," Mathematics Report, vol. 5, 2002, Technical University Clausthal, pp. 1-9.
International Search Report and Written Opinion for International Patent Application No. PCT/CN2014/070999, dated Aug. 25, 2014, 7 pages.
International Search Report and Written Opinion for International Patent Application No. PCT/CN2014/070997, dated Oct. 28, 2014, 8 pages.
International Search Report and Written Opinion for International Patent Application No. PCT/CN2014/084640, dated Jan. 8, 2015, 8 pages.
Nokia Siemens Networks, "R3-103555: On X2 signaling for TDM eICIC in Macro+Pico scenarios," Third Generation Partnership Project (3GPP), TSG RAN WG3 Meeting #70, Nov. 15-19, 2010, 4 pages, Jacksonville, USA.
Extended European Search Report for European Patent Application No. 14888742.5, dated Nov. 28, 2017, 8 pages.
Non-Final Office Action for U.S. Appl. No. 15/111,166, dated Feb. 23, 2018, 9 pages.

* cited by examiner

METHODS AND APPARATUSES FOR COORDINATING RESOURCE SCHEDULING BETWEEN WIRELESS NETWORKS

This application is a 35 U.S.C. § 371 national phase filing of International Application No. PCT/CN2014/070997, filed Jan. 21, 2014, the disclosure of which is incorporated herein by reference in its entirety.

TECHNICAL FIELD

The non-limiting and exemplary embodiments of the present disclosure herein relate to a wireless communication field. In particular, the embodiments herein relate to methods and apparatuses for coordinating resource scheduling between two or more wireless networks which operate on the same or overlapping radio resources.

BACKGROUND

With the rapid evolution of the wireless communication technique and increasing requirements for traffic throughput, a new type of network architecture, also known as an Ultra-dense Network ("UDN") has been proposed. The UDN is predominantly expected to be deployed in a form of "coverage islands" serving relatively small areas (e.g., an office building, a shopping mall, etc.). In general, a particular area is expected to be served by one UDN only, i.e., though possible, parallel deployments of multiple UDNs are considered unlikely. Adjacent or spatially separated UDN deployments are expected to be relatively well-isolated due to large radio propagation losses. This may be due to the fact that UDNs are expected to operate on high frequencies, e.g., in 10-100 GHz. It is therefore generally desirable to enable UDNs to utilize the full available bandwidth in a given frequency band in order to maximize the peak data rate and capacity, as opposed to the today's dominant practice of partitioning a frequency band in multiple frequency blocks assigned to only one network. For a better understanding of the UDN, the following will describe some operational details in reference to FIG. 1, which schematically illustrates a scenario for inter-UDN co-channel spectrum sharing.

First, it is assumed that there are two UDNs deployed in an open office as shown in FIG. 1, wherein the first UDN comprises an access node ("AN") 1, an aggregation node ("AGN") 1 which is a special AN and has a wired connection to a core network, a terminal device ("TD") 1 and a TD 3 and the second UDN comprises ANs 2 and 3, TDs 2 and 4, and an AGN 2. It is further assumed that the first UDN and the second UDN are owned by different operators. Under this network architecture and deployment, a TD, when moving around within the coverage of the UDN, can only access to different ANs belonging to the same operator. For example, although the AN 2 is further from the TD 2 than the AN 1, the TD 2 would have to access to the AN 2 rather than the AN 1 due to the same operator. Likewise, the TD 3 would access to the AN 1 rather than the AN 2. In this situation, when the adjacent, neighboring or perhaps partly overlapping UDNs 1 and 2 share the same frequency channel or operate on overlapping frequency channels, it is very likely that interference may arise between the nodes in UDNs 1 and 2, e.g., the interference between the wireless link 1 from the UDN 1 and the wireless link 2 from the UDN 2, as illustrated in FIG. 1. The impact of such inter-network interference on the wireless link quality may not be ignorable and would become more serious when a great number of the TDs are moving across the overlapping area of the different UDNs owned by respectively different operators.

SUMMARY

It is an object of the present disclosure to address the problems outlined above, and to provide a solution for coordinating resource scheduling between two or more wireless networks, such as the UDNs as discussed above. This object may be obtained by providing methods and apparatuses as follows.

According to an aspect of the disclosure, there is provided a method for use in a wireless network for coordinating resource scheduling between two or more wireless networks which operate on same or overlapping radio resources, wherein each wireless network comprises one or more radio access nodes and one or more terminal devices connected thereto. The method comprises detecting whether interference on at least one interfered wireless link in the wireless network caused by at least one interfering wireless link in at least one second wireless network exceeds a pre-determined threshold. The method also comprises initiating a resource coordination procedure with the at least one second wireless network by transmitting a resource coordination message to the at least one second wireless network when the interference exceeds the pre-determined threshold. The method further comprises performing, based on the resource coordination message, the resource coordination procedure with the at least one second wireless network to determine schedulable resources. The method additionally comprises scheduling the at least one interfered wireless link based on the determined schedulable resources.

In one embodiment, the resource coordination message indicates which radio resources are schedulable to the at least one interfered wireless link and the at least one interfering wireless link and wherein the radio resources schedulable to the at least one interfered wireless link and the radio resources schedulable to the at least one interfering wireless link are at least partially orthogonal to each other.

In another embodiment, the resource coordination message comprises a bit sequence in which each bit is indicative of whether a radio resource in at least one of a time domain, a frequency domain, a power domain, and a code domain is schedulable to the at least one interfered wireless link or schedulable to the at least one interfering wireless link.

In an additional embodiment, the performing the resource coordination procedure with the at least one second wireless network comprises receiving from the at least one second wireless network a response to the resource coordination message, wherein the response includes one of an acknowledgement, a negative acknowledgement and an update to the determined schedulable resources, and transmitting an updated resource coordination message to the at least one second wireless network when the response includes one of the negative acknowledgement and the update, or transmitting to the at least one second wireless network an acknowledgement message to the response.

In a further embodiment, the performing the resource coordination procedure with the at least one second wireless network comprises transmitting, when the interference falls below the pre-determined threshold or does no longer occur for a pre-determined period of time, or the determined schedulable resources become invalid, to the at least one second wireless network a coordinated resource release message to release at least some of the coordinated resources or an updated resource coordination message to update at least some of the coordinated resources.

According to another aspect of the disclosure, there is provided a method for use in a wireless network for coordinating resource scheduling between two or more wireless networks which operate on same or overlapping radio resources, wherein each wireless network comprises one or more radio access nodes and one or more terminal devices connected thereto. The method comprises receiving a resource coordination message to initiate a resource coordination procedure with at least one second wireless network, wherein the resource coordination message is received from the at least one second wireless network when interference caused by at least one interfering wireless link in the wireless network on at least one interfered wireless link in the at least one second wireless network exceeds a pre-determined threshold. The method also comprises performing, based on the resource coordination message, the resource coordination procedure with the at least one second wireless network to determine schedulable resources. The method further comprises scheduling the at least one interfering wireless link based on the determined schedulable resources.

In an embodiment, the resource coordination message indicates which radio resources are schedulable to the at least one interfered wireless link and the at least one interfering wireless link and wherein the radio resources schedulable to the at least one interfered wireless link and the radio resources schedulable to the at least one interfering wireless link are at least partially orthogonal to each other.

In another embodiment, the resource coordination message comprises a bit sequence in which each bit is indicative of whether each radio resource in at least one of a time domain, a frequency domain, a power domain and a code domain is schedulable to the at least one interfered wireless link or schedulable to the at least one interfering wireless link.

In yet another embodiment, the performing the resource coordination procedure with the at least one second wireless network comprises transmitting to the at least one second wireless network a response to the resource coordination message, wherein the response includes one of an acknowledgement, a negative acknowledgement and an update to the schedulable resources and receiving an updated resource coordination message from the at least one second wireless network when the response includes one of the negative acknowledgement and the update, or receiving from the at least one second wireless network an acknowledgement message to the response.

In a further embodiment, the performing the resource coordination procedure with the at least one second wireless network comprises receiving, when the interference falls below the pre-determined threshold or does no longer occur for a pre-determined period of time, or the determined schedulable resources become invalid, from the at least one second wireless network, a coordinated resource release message to release the coordinated resources or an updated resource coordination message to update at least some of the coordinated resources.

According to an aspect of the disclosure, there is provided an apparatus for coordinating resource scheduling allocation between two or more wireless networks which operate on same or overlapping radio resources, wherein each wireless network comprises one or more radio access nodes and one or more terminal devices connected thereto. The apparatus comprises a detecting unit configured to detect whether interference on at least one interfered wireless link in a wireless network caused by at least one interfering wireless link in at least one second wireless network exceeds a pre-determined threshold. The apparatus also comprises an initiating unit configured to initiate a resource coordination procedure with the at least one second wireless network by transmitting a resource coordination message to the at least one second wireless network when the interference exceeds the pre-determined threshold. The apparatus further comprises a performing unit configured to perform, based on the resource coordination message, the resource coordination procedure with the at least one second wireless network to determine schedulable resources. The apparatus additionally comprises a scheduling unit configured to schedule the at least one interfered wireless link based on the determined schedulable resources.

According to another aspect of the disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises a receiving unit configured to receive a resource coordination message to initiate a resource coordination procedure with at least one second wireless network, wherein the resource coordination message is received from the at least one second wireless network when interference caused by at least one interfering wireless link in the wireless network on at least one interfered wireless link in the at least one second wireless network exceeds a pre-determined threshold. The apparatus also comprises a performing unit configured to perform, based on the resource coordination message, the resource coordination procedure with the at least one second wireless network to determine schedulable resources. The apparatus further comprises a scheduling unit configured to schedule the at least one interfering wireless link based on the determined schedulable resources.

According to an aspect of the present disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises at least one processor and at least one memory including computer program code, wherein the at least one memory and the computer program code are configured to, with the at least one processor, cause the apparatus at least to detect whether interference on at least one interfered wireless link in the wireless network caused by at least one interfering wireless link in at least one second wireless network exceeds a pre-determined threshold. The at least one memory and the computer program code are also configured to, with the at least one processor, cause the apparatus at least to initiate a resource coordination procedure with the at least one second wireless network by transmitting a resource coordination message to the at least one second wireless network when the interference exceeds the pre-determined threshold. The at least one memory and the computer program code are further configured to, with the at least one processor, cause the apparatus at least to perform, based on the resource coordination message, the resource coordination procedure with the at least one second wireless network to determine schedulable resources. The at least one memory and the computer program code are additionally configured to, with the at least one processor, cause the apparatus at least to schedule the at least one interfered wireless link based on the determined schedulable resources.

According to an aspect of the present disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises at least one processor and at least one memory including computer program code, wherein the at least one memory and the computer program code are configured to, with the at least one processor, cause the apparatus at least to receive a resource coordination message to initiate a resource coordination procedure with at least one second wireless network, wherein the resource coordination message is received from the at least one second wireless network when interference caused by at least one interfering wireless link in the wireless network on at least one interfered wireless link in the at least one second wireless network exceeds a pre-determined threshold. The at least one memory and the computer program code are also configured to, with the at least one processor, cause the apparatus at least to perform, based on the resource coordination message, the resource coordination procedure with the at least one second wireless network to determine schedulable resources. The at least one memory and the computer program code are further configured to, with the at least one processor, cause the apparatus at least to schedule the at least one interfering wireless link based on the determined schedulable resources.

According to an aspect of the present disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises processing means adapted to detect whether interference on at least one interfered wireless link in the wireless network caused by at least one interfering wireless link in at least one second wireless network exceeds a pre-determined threshold. The processing means is also adapted to initiate a resource coordination procedure with the at least one second wireless network by transmitting a resource coordination message to the at least one second wireless network when the interference exceeds the pre-determined threshold. The processing means is further adapted to perform, based on the resource coordination message, the resource coordination procedure with the at least one second wireless network to determine schedulable resources. The processing means is additionally adapted to schedule the at least one interfered wireless link based on the determined schedulable resources.

According to another aspect of the present disclosure, there is provided an apparatus for coordinating resource scheduling between two or more wireless networks which operate on same or overlapping radio resources, wherein each wireless network comprises one or more radio access nodes and one or more terminal devices connected thereto. The apparatus comprises processing means adapted to receive a resource coordination message to initiate a resource coordination procedure with at least one second wireless network, wherein the resource coordination message is received from the at least one second wireless network when interference caused by at least one interfering wireless link in the wireless network on at least one interfered wireless link in the at least one second wireless network exceeds a pre-determined threshold. The processing means is also adapted to perform, based on the resource coordination message, the resource coordination procedure with the at least one second wireless network to determine schedulable resources. The processing means is further adapted to schedule the at least one interfering wireless link based on the determined schedulable resources.

By means of solutions discussed in the various aspects and embodiments as mentioned above, the interference taking place between wireless networks can be avoided or at least reduced by coordinating resource scheduling. Further, by performance of coordination among two or more wireless networks, radio resources can be effectively and dynamically scheduled and used, thereby improving spectrum efficiency. Further, by using the resource coordination message, the sensitive information, such as valuation of radio resources, may not need to be disclosed or shared between different operators, thereby giving network security a big boost.

BRIEF DESCRIPTION OF THE DRAWINGS

Embodiments will now be described in more detail in relation to the enclosed drawings, in which.

DETAILED DESCRIPTION

Figure 1:
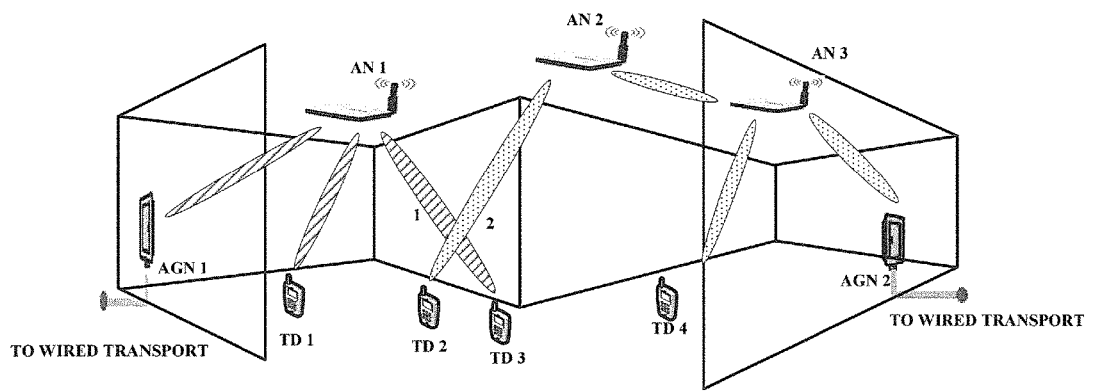
FIG. 1 is a schematic overview depicting a scenario for inter-UDN co-channel spectrum sharing.

The present disclosure will now be described more fully hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the specification.

Generally, all terms used in the claims are to be interpreted according to their ordinary meaning in the technical field, unless explicitly defined otherwise herein. For example, the terminal device ("TD"), may be any suitable wireless communication terminal or user equipment ("UE"), such as a mobile phone or a portable computer, which is capable of operating in the Ultra-dense Network ("UDN"). Likewise, the wireless access node may be any suitable wireless communication intermediary devices, such as a wireless relay node, a wireless router, a wireless access point, a base station or a base site, which is capable of connecting the terminal device to another wireless access node or connecting the terminal device to the core network.

The interference, as discussed throughout the present description, may relate to acceptable interference and unacceptable interference, wherein the acceptable interference is caused by an interference signal (e.g., from an interfering UDN) to the wireless link in the interfered UDN and does not degrade the current selection of modulation and coding scheme ("MCS") at a receiver. As compared thereto, the unacceptable interference would degrade the MCS selection and needs to be avoided or at least reduced. The distinguishing of the acceptable interference and unacceptable interference may be accompanied by setting a pre-determined threshold (in dBm) in term of a signal level, below which an interference signal would cause acceptable interference and may be negligible and above which an interference signal would cause unacceptable interference on the wireless link and needs to be eliminated or at least reduced.

The wireless links that are affected by the interference may consist of a number of inter-network link pairs, each of which includes one wireless link in a first UDN that suffers from interference from another wireless link in a second UDN since the inter-network interference exceeds the pre-determined threshold. For a simplified purpose, throughout the present description, the victim link in the above inter-network link pair is referred to as the interfered link and the aggressor link is referred to as the interfering link. Further, a wireless link, according to the embodiments of the present disclosure, is defined as a unidirectional transmission between two nodes, one transmitter node and one receiver node, belonging to the same network. Such a link may exist between a terminal device and a radio access node or between radio access nodes when the UDN applies wireless self-backhauling.

All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

Figure 2:
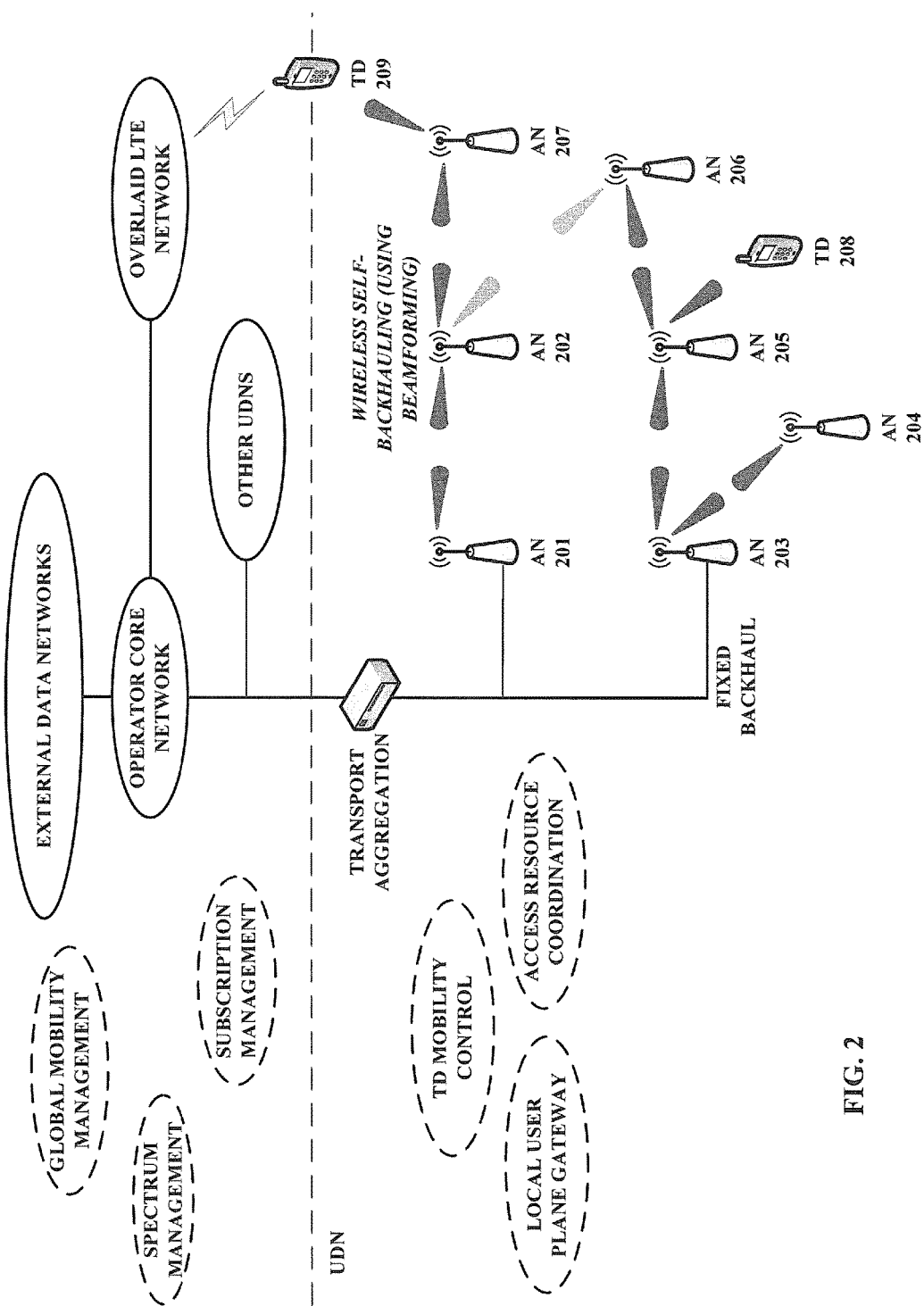
FIG. 2 is a schematic diagram depicting a UDN architecture in which embodiments of the present disclosure may be practiced.

FIG. 2 is a schematic diagram depicting a UDN architecture in which embodiments of the present disclosure may be practiced. As shown in FIG. 2, the UDN architecture, among other things, includes wireless Access Nodes (ANs) and terminal devices (TDs), such as ANs 201-207 and TDs 208-209. Since UDNs are envisioned to provide ubiquitous mobile broadband with access-node densities considerably higher than the densest cellular networks of today, the distance between ANs is from a few meters in indoor deployments up to around 50 m in outdoor deployment. The ANs in the UDN may perform scheduling and baseband processing and terminate the radio interface (including physical, medium access, and link layers) towards the TDs. The ANs may also directly be connected to fixed transport backhaul or can be wirelessly backhauled by other ANs, e.g., the AN 201 being connected with the AN 203 via a fixed backhaul link and the AN 201 being connected with the AN 202 via a wireless link. The ANs may additionally connect to a transport aggregation node over which the ANs may communicate with the operator core network, external data network (for example, internet) or other UDNs provided by different operators. The ANs may be aided by several logical functional entities responsible for managing various aspects of the UDN, including access resource coordination, TD mobility control, and local user plane gateway functionality. These functional entities may in some scenarios be implemented in the ANs, local servers or even in the remote cloud. Similarly, there would be multiple logical functional entities responsible for global mobility management, spectrum management and subscription management at the core network side.

Figure 3:
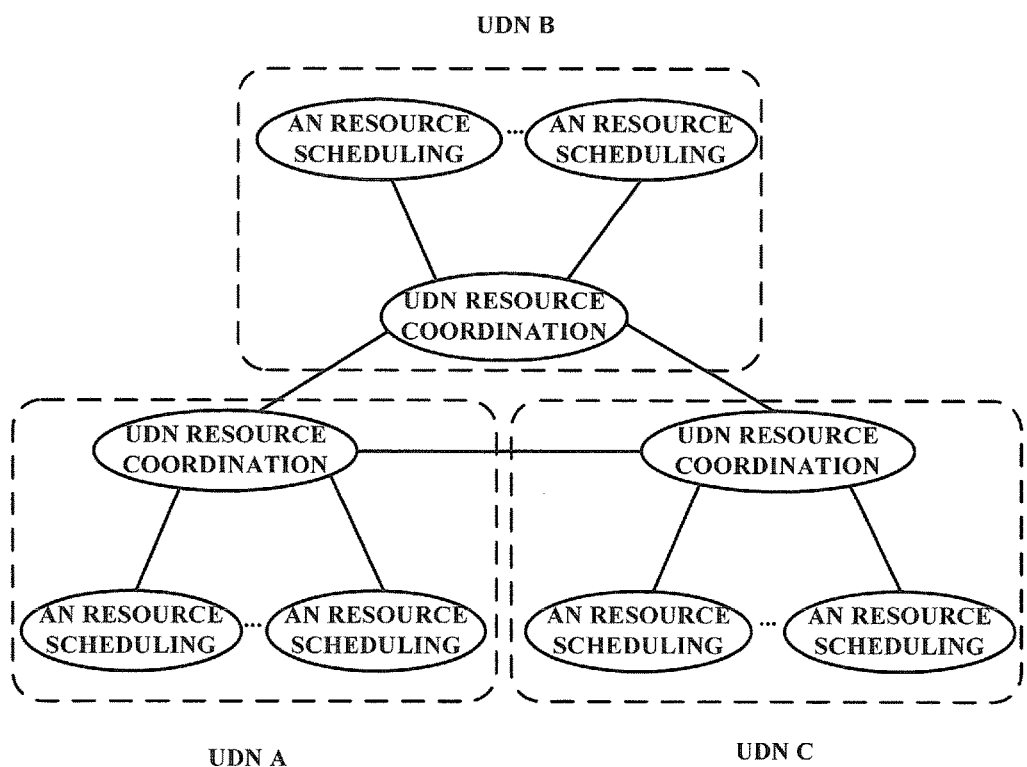
FIG. 3 is a schematic diagram illustrating logical distributed structure of UDNs according to an embodiment of the present disclosure.

FIG. 3 is a schematic diagram illustrating logical distributed structure of UDNs. According to embodiments of the present disclosure, the logical distributed architecture is intended to enable inter-UDN coordinated radio resource sharing (e.g., spectrum sharing). To this end, two kinds of functional entities are established, i.e., UDN resource coordination and AN resource scheduling entities, as depicted in UDNs A, B and C in FIG. 3. The details about the two functional entities are given for illustrative purposes as follows:

UDN Resource Coordination ("URC"): This functional entity is specific to one UDN and is responsible for coordinating resources between ANs belonging to the same UDN, and also for coordinating resources between ANs belonging to different UDNs (i.e., UDNs A, B and C in this example) and operators. The URC may be implemented in a dedicated network control node, in one of the ANs, distributed across a set of ANs or in the cloud.

AN resource scheduling ("ARS"): This functional entity is specific to AN and is responsible for allocating resource to all its involved links including the access link and backhaul link based on received constraint of allowed resource from URC.

These two logical functional entities may have different choices on the implemented physical nodes. URC may in some scenarios be implemented in the ANs but may also be implemented in local servers.

Under this logical distributed structure, the ANs within one UDN are able to exchange messages with individual ANs in other UDNs for coordinating radio resource usage. In this manner, the likelihood that interfering transmissions are scheduled on the same radio resources could be avoided or at least reduced to a certain degree. According to the embodiments of the present disclosure, it is assumed that there would be a logical control channel established for exchange of such messages. Such a logical control channel could be implemented over-the-air, i.e., as a part of the transmission scheme, or over the backhaul link Further, it is also assumed that the UDNs according to the embodiments of the present disclosure are scheduled frame-based systems, which may partition radio resources for multiple access in time, frequency, power, or code domain and within which nodes are synchronized in the time and frequency domains or at least time synchronized across networks.

Figure 4:
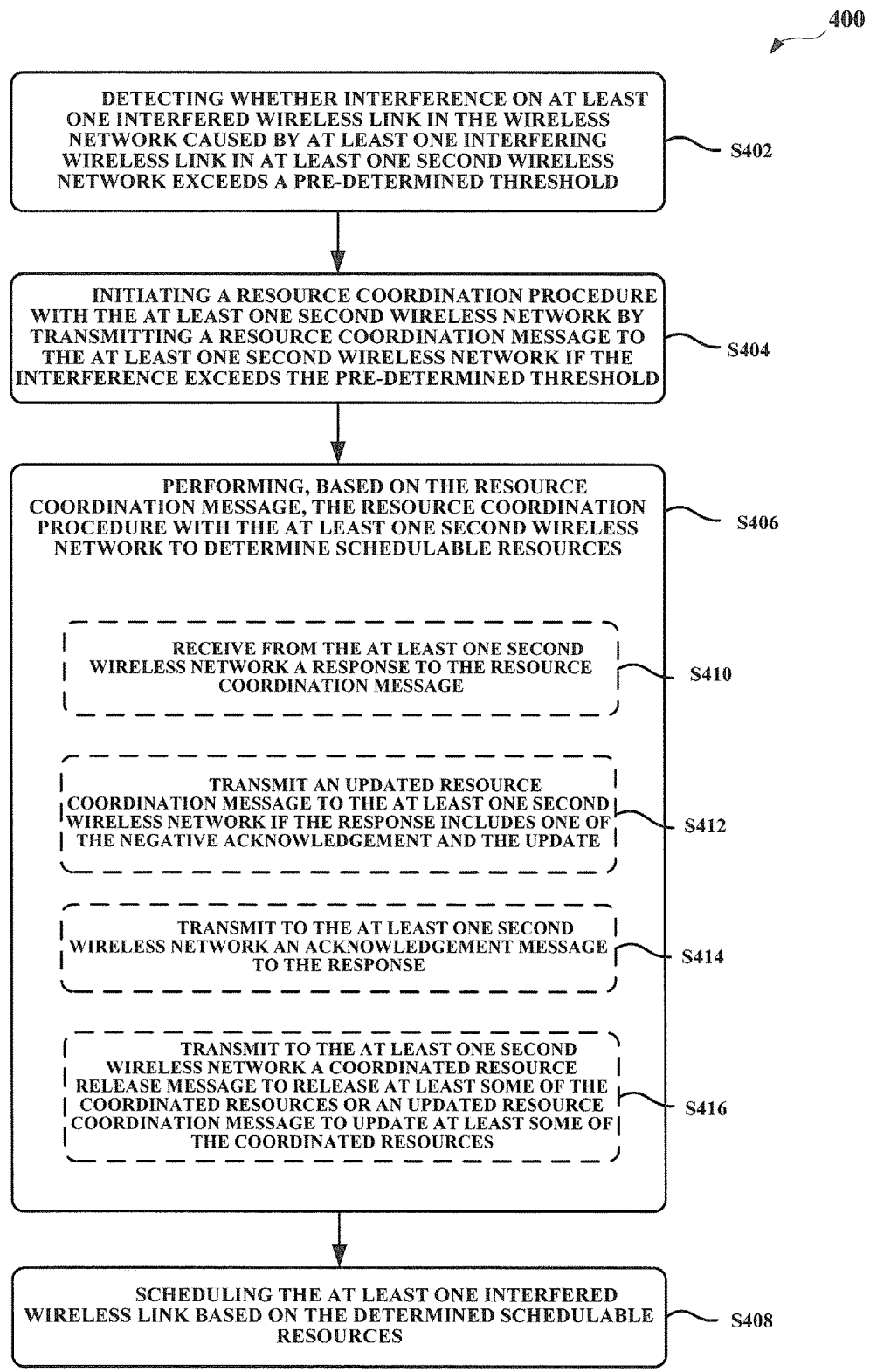
FIG. 4 is a schematic flowchart of a method for use in a wireless network for coordinating resource scheduling according to an embodiment of the present disclosure.

FIG. 4 is a schematic flowchart of a method 400 for use in a wireless network for coordinating resource scheduling according to an embodiment of the present disclosure. Although not shown, it should be noted that the coordinating may take place between two or more wireless networks which operate one same or overlapping radio resources, wherein each wireless network comprises one or more radio ANs and one or more TDs connected thereto, for example, as shown in FIG. 2.

As illustrated in FIG. 4, at step S402, the method 400 detects whether interference on at least one interfered wireless link in the wireless network (e.g., a UDN) caused by at least one interfering wireless link in at least one second wireless network (e.g., another UDN) exceeds a pre-determined threshold. Then, at step S404, the method 400 initiates a resource coordination procedure with the at least one second wireless network by transmitting a resource coordination message to the at least one second wireless network when the interference exceeds the pre-determined threshold. Although not shown, in one embodiment, the resource coordination message herein may indicate which radio resources are schedulable to the at least one interfered wireless link and the at least one interfering wireless link and wherein the radio resources schedulable to the at least one interfered wireless link and the radio resources schedulable to the at least one interfering wireless link are at least partially orthogonal to each other. Further, in some embodiments, the resource coordination message may comprise a bit sequence in which each bit is indicative of whether a radio resource in at least one of a time domain, a frequency domain, a power domain, and a code domain is schedulable to the at least one interfered wireless link or schedulable to the at least one interfering wireless link, as will be discussed in detail in reference to FIG. 6.

Upon initiation of the resource coordination procedure, the method 400 proceeds to step S406, at which the method 400 performs, based on the resource coordination message, the resource coordination procedure with the at least one second wireless network to determine schedulable resources. After that, the method 400 schedules the at least one interfered wireless link based on the determined schedulable resources at step S408.

As illustrated in the block of the step S406, in performing the resource coordination procedure with the at least one second wireless network, the method 400 may take several steps to do so. For example, in some embodiments, the method 400 receives, at step S410, from the at least one second wireless network a response to the resource coordination message, wherein the response includes one of an acknowledgement ("ACK"), a negative acknowledgement ("NACK") and an update to the determined schedulable resources. The update herein may refer to a suggested change to the determined schedulable resources or a proposal for the determined schedulable resources such that a final determined schedulable resources would better suit the resource scheduling requirements of the at least one second wireless network and avoid the interference as much as possible. Then, at step S412, the method 400 may transmit an updated resource coordination message to the at least one second wireless network when the response includes one of the NACK and update. As an alternative, the method 400, at step S414, may transmit to the at least one second wireless network an ACK message to the response. Further, the method 400, at step S416, may transmit, when the interference falls below the pre-determined threshold or does no longer occur for a pre-determined period of time, or the determined schedulable resources become invalid, to the at least one second wireless network a coordinated resource release message to release at least some of the coordinated resources or an updated resource coordination message to update at least some of the coordinated resources.

By virtue of the method 400 as performed in the interfered UDN and its several variants or improvements as set forth in the above embodiments, the interference, particularly the unacceptable interference as discussed before, between two wireless links could be avoided or at least diminished, depending on, e.g., the number of the schedulable resources. Meanwhile, by the resource coordinating, the radio resource could be flexibly and efficiently applied and therefore spectrum efficiency may be notably improved.

Figure 5:
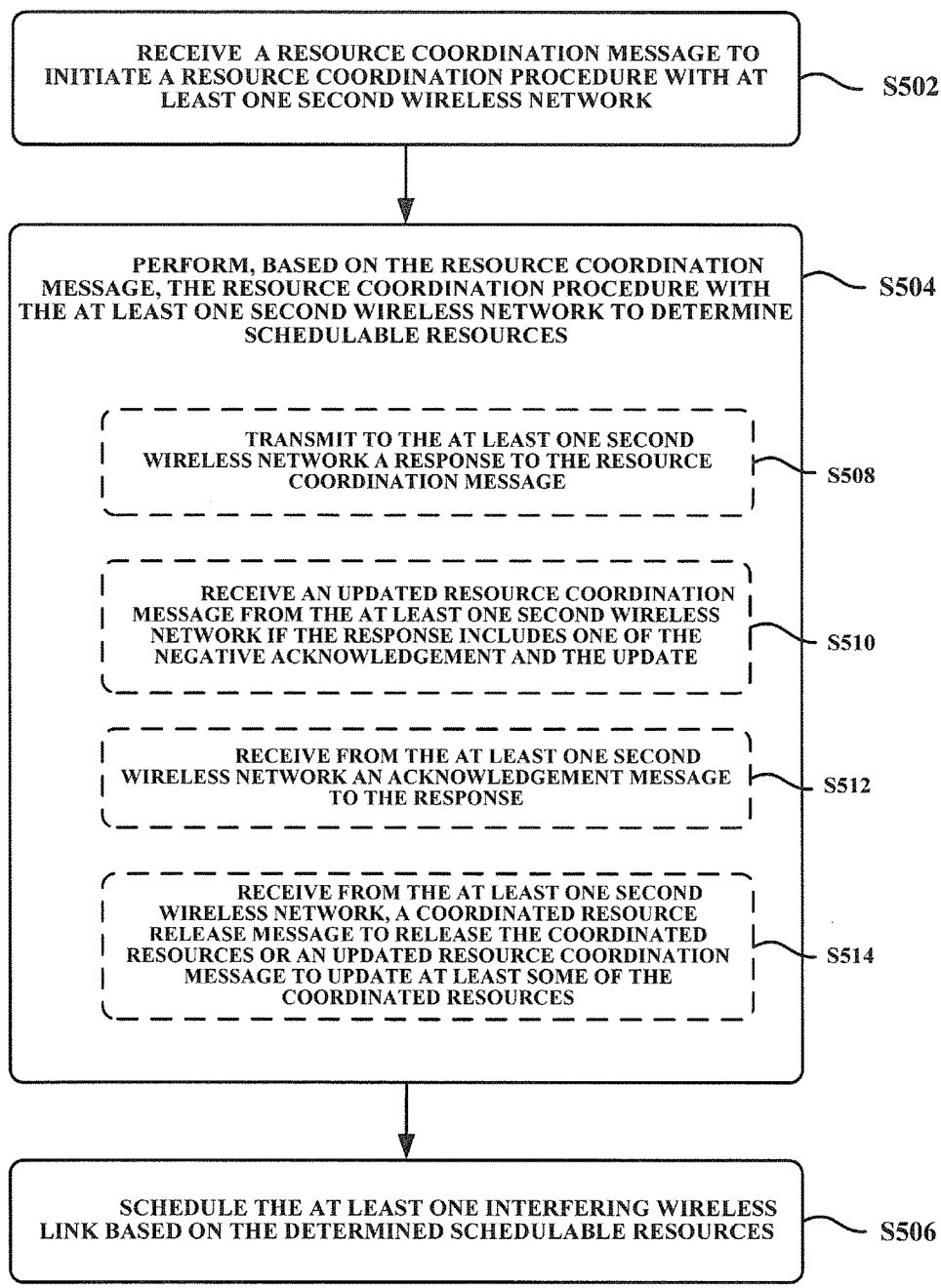
FIG. 5 is a schematic flowchart of a method for use in a wireless network for coordinating resource scheduling according to another embodiment of the present disclosure, FIG. 6 are principle diagrams illustrating examples of coordination contexts (CCs) according to embodiments of the present disclosure.

FIG. 5 is a schematic flowchart of a method 500 for use in a wireless network for coordinating resource scheduling according to another embodiment of the present disclosure. Similar to the method 400, it should be noted that the coordinating may take place between two or more wireless networks which operate one same or overlapping radio resources, wherein each wireless network comprises one or more radio ANs and one or more TDs connected thereto, for example, as shown in FIG. 2.

As illustrated in FIG. 5, the method 500, at step S502, receives a resource coordination message to initiate a resource coordination procedure with at least one second wireless network, wherein the resource coordination message is received from the at least one second wireless network when interference caused by at least one interfering wireless link in the wireless network on at least one interfered wireless link in the at least one second wireless network exceeds a pre-determined threshold. In other words, the at least one second wireless network (for example, an interfered AN or TD within it) detects that the interference exceeds the pre-determined threshold and therefore transmits the resource coordination message to the wireless network at issue to initiate the resource coordination procedure therewith. The resource coordination message herein may have the same meaning and implementations as those discussed in the method 400 and thus further details thereof are omitted herein for a concise purpose.

Then, at step S504, the method 500 performs, based on the resource coordination message, the resource coordination procedure with the at least one second wireless network to determine schedulable resources. Once the schedulable resources are determined, the flow advances to step S506, at which the method 500 schedules the at least one interfering wireless link based on the determined schedulable resources.

As illustrated in the block of the step S504, in performing the resource coordination procedure with the at least one second wireless network, the method 500 may take several steps to do so. For example, at step S508, the method 500 may transmit to the at least one second wireless network a response to the resource coordination message, wherein the response includes one of an ACK, a NACK and an update to the schedulable resources. Then, at step S510, the method 500 may receive an updated resource coordination message from the at least one second wireless network when the response includes one of the NACK and the update. As an alternative, the method 500 may receive, at step S512, from the at least one second wireless network an ACK message to the response. Further, the method 500, may receive, at step S514, from the at least one second wireless network, a coordinated resource release message to release the coordinated resources or an updated resource coordination message to update at least some of the coordinated resources, when the interference falls below the pre-determined threshold or does no longer occur for a pre-determined period of time, or the determined schedulable resources become invalid.

By virtue of the method 500 as performed in the interfering UDN and its several variants or improvements as set forth in the above embodiments, the interference, particularly the unacceptable interference as discussed before, between two wireless links could be avoided or at least diminished. Further, spectrum efficiency could also be enhanced through the resource coordination.

Figure 6:
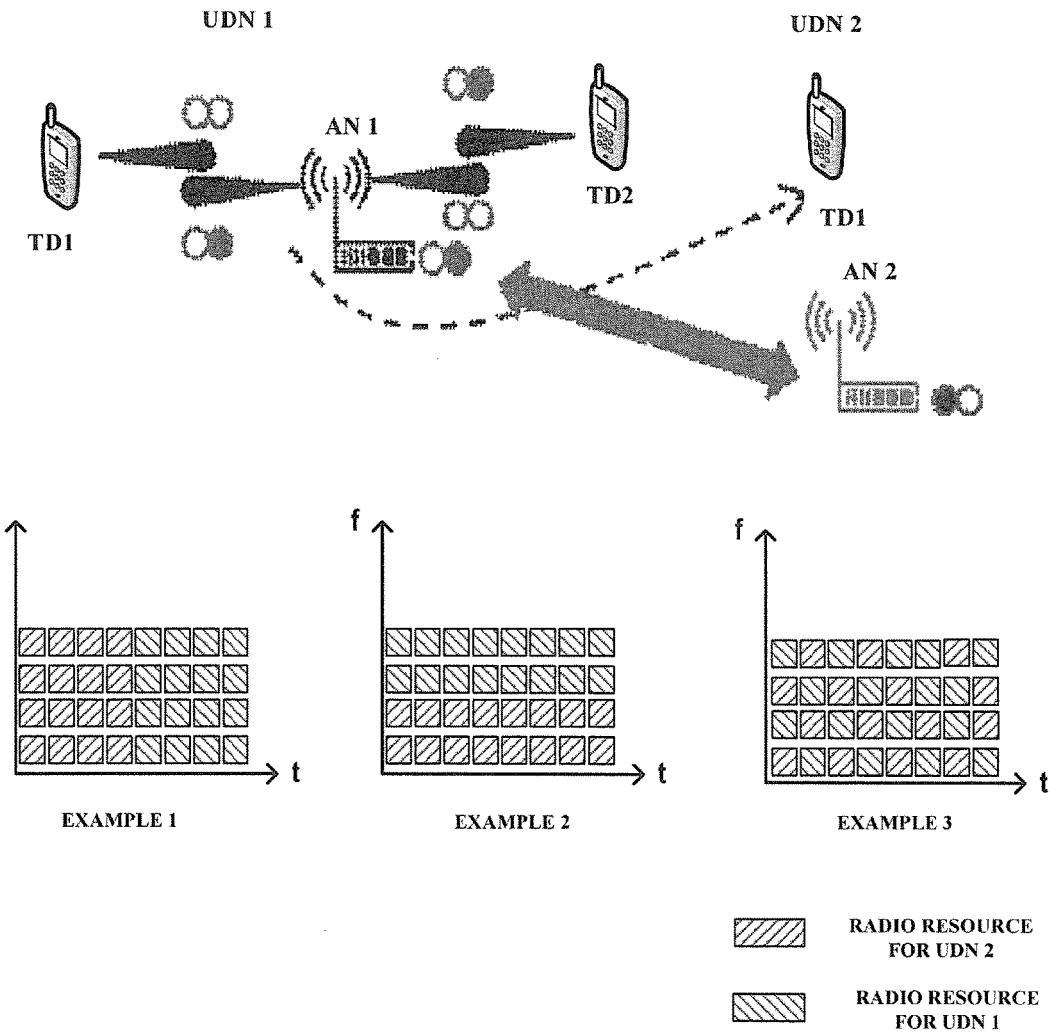

For a better understanding of the resource coordination message as mentioned above, the following will discuss a coordination context ("CC"), which may be carried by, as a part of, or act as the resource coordination message, with reference to FIG. 6, which shows principle diagrams illustrating examples of CCs according to embodiments of the present disclosure.

According to the embodiments of the present disclosure, when interference between two wireless links A and B (i.e., interfering and interfered wireless links), where the wireless link A belongs to a UDN 1 and the wireless link B belongs to a UDN 2, exceeds a pre-determined threshold, coordination of radio resource usage would take place through assigning a CC to the wireless link A in the UDN 1 and the wireless link B in the UDN 2. For example, as illustrated in FIG. 6, when the TD 1 moves from the coverage area of the UDN 1 into the coverage area of the UDN 2, due to having been subscribed to different operators, the TD 1 would still have to access to the AN 1 rather than AN 2; therefore, the uplink between the TD 1 and AN 1 would affect the uplink between the TD 2 and the AN 2. When this interference exceeds the pre-determined threshold, the resource coordination procedure would be initiated and a CC may be involved.

As an example, a CC may be a data structure that indicates on which radio resources the UDN 1 may schedule transmissions of the wireless link A and on which radio resources the UDN 2 may schedule transmissions of the wireless link B, and these two subsets of radio resources are at least partly orthogonal to each other.

According to an embodiment of the present disclosure, a set of available radio resources may consist of a two-dimensional array, wherein the horizontal dimension represents a time dimension (in time slots) and the vertical dimension represents frequency subchannels (in subcarriers or resource blocks), as three examples shown in FIG. 6. In this manner, a CC would be an array of binary numbers or a bit sequence, one radio resource per bit, which indicates whether the corresponding wireless link may be scheduled on the corresponding radio resource or not. For instance, a CC for the uplink transmission of the TD1 may include a bit sequence of "11110000," which expresses that the first four radio resources are schedulable to TD1 and second four radio resources are not schedulable to TD1. As for the uplink transmission of the TD 2, through a resource coordination procedure as discussed in the methods 400 and 500, a counter-CC may be formed which may include a bit sequence of "00001111" and express that the first four radio resources are not schedulable to the TD2 and the second four radio resources are schedulable to the TD2. That is, the first 50% of the resources are assigned to the interfering wireless link and the other 50% of the resources are assigned to the interfered wireless link After that, the transmissions respectively associated with the interfering wireless link and the interfered wireless link would be scheduled to use these assigned resources.

According to the embodiments of the present disclosure, the interfered and interfering wireless links could be scheduled according to the determined schedulable resources by establishing, updating, coordinating or developing CCs, which will be discussed in detail below with reference to FIGS. 7-13, as non-limiting examples.

Figure 7:
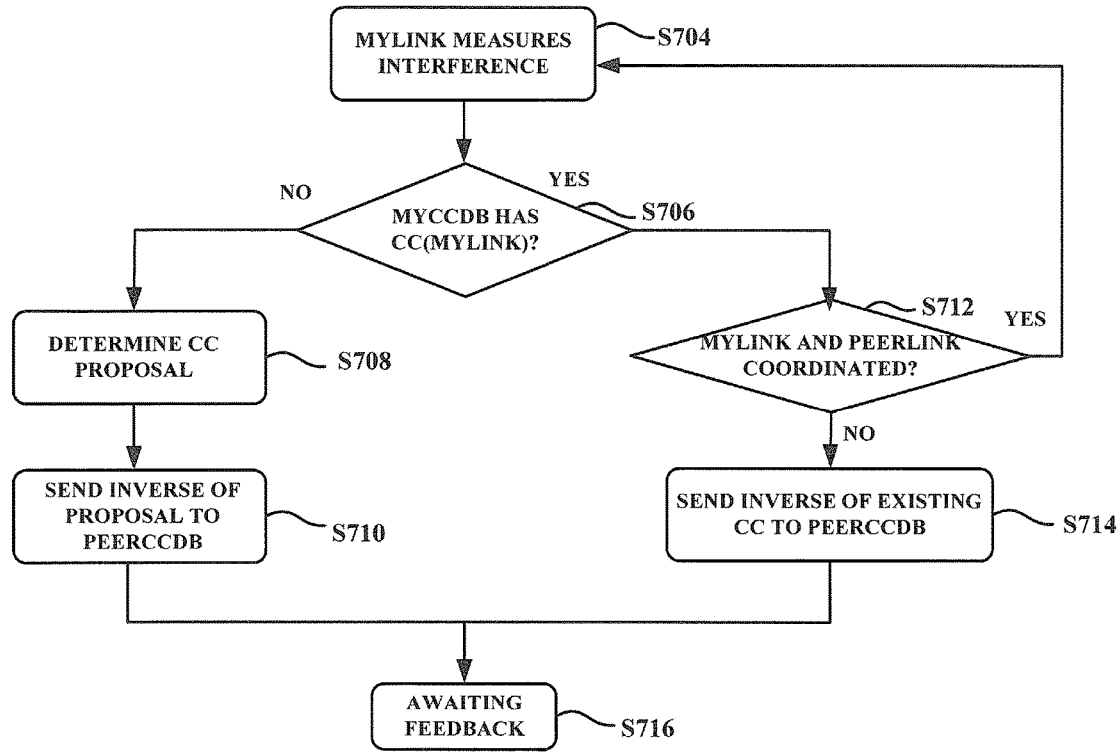
FIG. 7 is a schematic flowchart of a process for a coordination context establishment according to an embodiment of the present disclosure.

FIG. 7 is a schematic flowchart of a process 700 for a CC establishment at an interfered wireless link side according to an embodiment of the present disclosure. As illustrated in FIG. 7, the process 700 starts at step S704, at which the functional unit or node as discussed with reference to FIGS. 2 and 3, such as AN or the terminal device in the UDN performs inter-UDN interference measurement periodically or triggered by certain event (e.g., measured SINR below one threshold). The interference herein may be from the interfering wireless link, which is shown as the "PEERLINK" for short, on the interfered wireless link, which is shown as the "MYLINK" for short.

Upon detecting that the interference exceeds a pre-determined threshold, the interfered node checks, at step S706, its own CC database ("MYCCDB" for short) to determine if the CCDB has a CC associated with the interfered wireless link. If this is the case, for example, the CC is "11110000," then at step S712, the interfered node determines whether this CC has already been coordinated with the interfering link ("PEERLINK") of the interfering node. If this is the case, then the flow would loop back to the step S704; otherwise, the interfered node, at step S714, sends to a CCDB of the interfering node ("PEERCCDB" for short) a new CC, 00001111, which is an inverse of the existing CC, as previously discussed with reference to FIG. 6.

If the answer at step S706 is "NO," then at step S708, the interfered node determines the CC proposal, for example, 11110000, and at step S710, sends the inverse of a CC proposal, for example, "00001111", to the PEERCCDB such that additional constraints on radio resource usage at the interfered network could be avoided. After that, the interfered node, at step S716, waits for a feedback (ACK, NACK, or a CC counter-proposal as an update) from the interfering node. The sending of the inverse of the CC proposal may be implemented by a dedicated initial CC proposal message or embedding the inverse of the CC proposal in another message.

As an example, the CC proposal, when not coordinated for the wireless link, could be made based on a predicted resource demand by the interfered node and may claim more or less than 50% of the resources.

Figure 8:
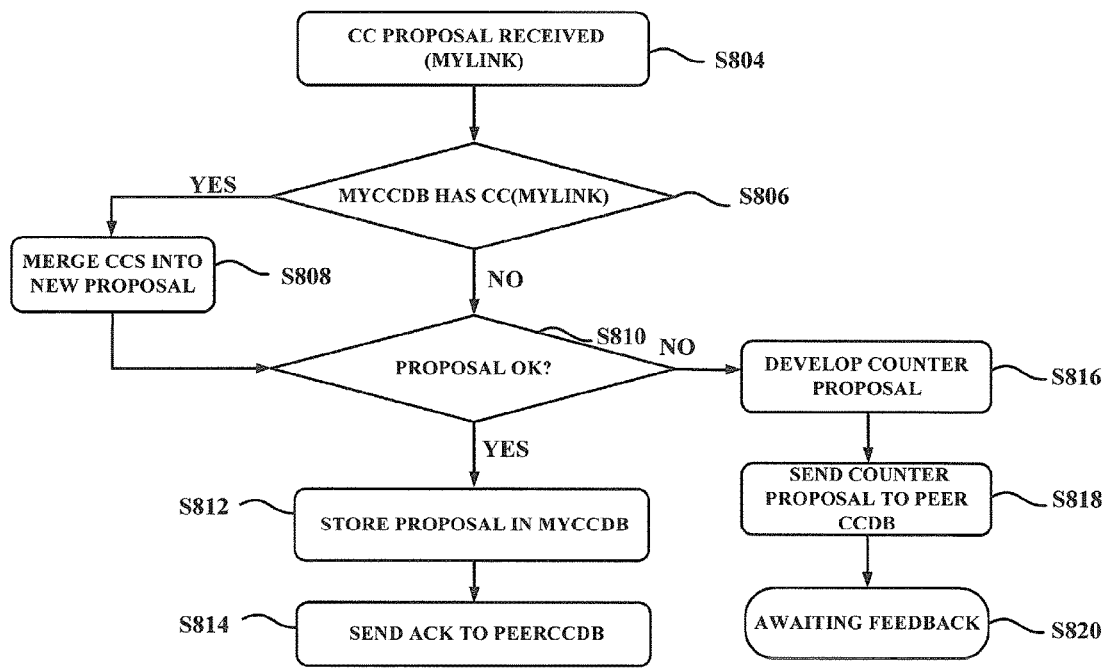
FIG. 8 is a schematic flowchart of a process for receiving and responding to a coordination context proposal according to an embodiment of the present disclosure.

FIG. 8 is a schematic flowchart of a process 800 for receiving and responding to a CC proposal (i.e., a resource coordination message) at an interfering link side according to an embodiment of the present disclosure. As illustrated in FIG. 8, the interfering node (e.g., AN or TD), at step S804, receives the CC proposal in relation to the interfering link ("MYLINK" for the interfering node) and interfered link, and determines, at step S806, whether its CCDB already has a CC associated with the interfering link. If this is the case, then at step S808, the interfering node merges the newly received CC with the already existing CC (for example, by using a logical AND concatenation) and at step S810, checks if the merged CC is acceptable. If this is the case, then at step S812, the interfering node stores the merged proposal in its own CCDB and at step S814, sends an ACK to the PEER-CCDB, i.e., the CCDB of the interfered node. Then, a resource coordination procedure as beginning at step S704 has been completed.

If the answer at step S806 is "NO," then the process 800 proceeds to step S810, at which the interfering node determine whether the received CC is acceptable. If this is the case, then as discussed above, the interfering node stores the received CC in its own CCDB and sends the ACK to the interfered node. However, if the answer at step S810 is "NO," then at step S816, the interfering node develops a counter-CC proposal. One possible way of developing a counter-CC proposal is to claim the same amount of resources the original proposal contains, but to select other resources as available so that the overall amount of resources remains the same. After that, the interfering node sends the counter CC proposal to the CCDB of the interfered node at step S818 and waits for a feedback or response from the interfered node at step S820. This counter-CC proposal is then either accepted or answered with another counter-CC proposal (i.e., coordination) made by the interfered node, which will be discussed below with reference to FIG. 9.

The number of coordination procedures between the interfering and interfered nodes about the CC proposal may be limited to a finite number of times. For instance, the finite number of times could be two or three, which may be pre-determined, for example, according to statistics or experimental data in terms of spectrum efficiency or similar factors or by taking the type of ongoing traffic (delay-sensitive or delay-insensitive) into account. Once the finite number of times has been reached and no CC has been agreed upon, the coordination process would be aborted and the two UDNs continue operations in an uncoordinated way.

Figure 9:
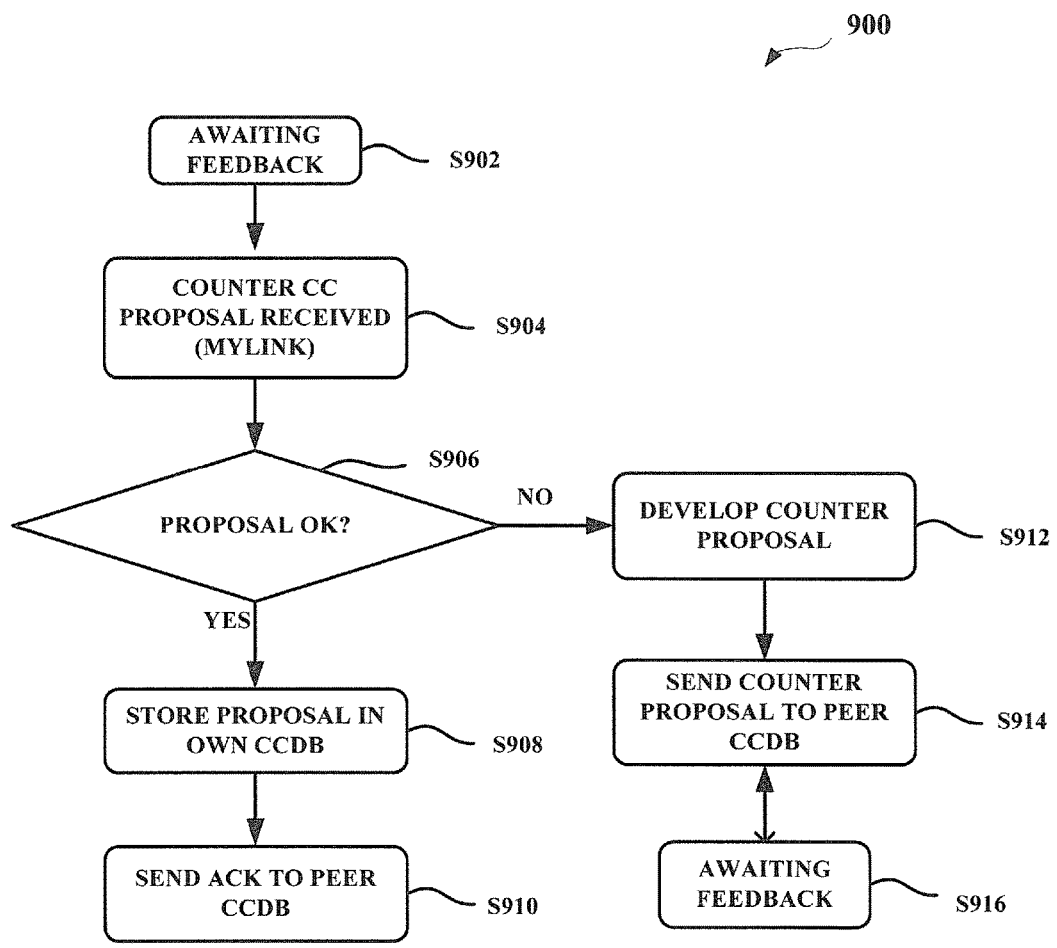
FIG. 9 is a schematic flowchart of a process for receiving a counter-coordination context proposal according to an embodiment of the present disclosure.

FIG. 9 is a schematic flowchart of a process 900 for receiving a counter-CC proposal at the interfered node according to an embodiment of the present disclosure. As illustrated in FIG. 9, continuing with the step S716, at step S902, the interfered node still awaits the feedback from the interfering node. Then, at step S904, the interfered node receives the counter-CC proposal as sent by the interfering node at step S818 in FIG. 8. At step S906, the interfered node determine whether the counter-CC proposal is acceptable. If this is the case, then at step S908, the interfered node stores the counter-CC proposal in its own CCDB and at step S910, sends an ACK to the CCDB of the interfering node. If the answer at step S906 is "NO," then, as above mentioned, the interfered node develops a new counter-CC proposal at step S912 and at step S914, sends this new counter-CC proposal to the interfering node. After that, the interfered node waits for a feedback from the interfering node at step S916.

Figure 10:
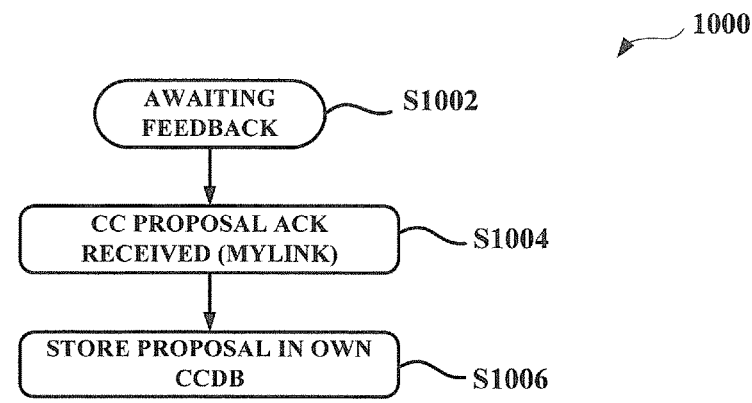
FIG. 10 is a schematic flowchart of a process for receiving a confirmation to a previously-sent coordination context proposal according to an embodiment of the present disclosure.

FIG. 10 is a schematic flowchart of a process 1000 for receiving a confirmation to a previously-sent CC proposal according to an embodiment of the present disclosure. As illustrated in FIG. 10, continuing with the step S916 in FIG. 9, at step S1002, the interfering node still waits for the feedback from the interfered node. Then, at step S1004, the interfering node receive an ACK sent by the interfered node at step S910 in FIG. 9, to confirm the counter-CC proposal sent by the interfering node at step S818 in FIG. 8. Then, the interfering node stores the counter-CC proposal in its own CCDB. After that, the resource coordination procedure has been completed.

Figure 11:
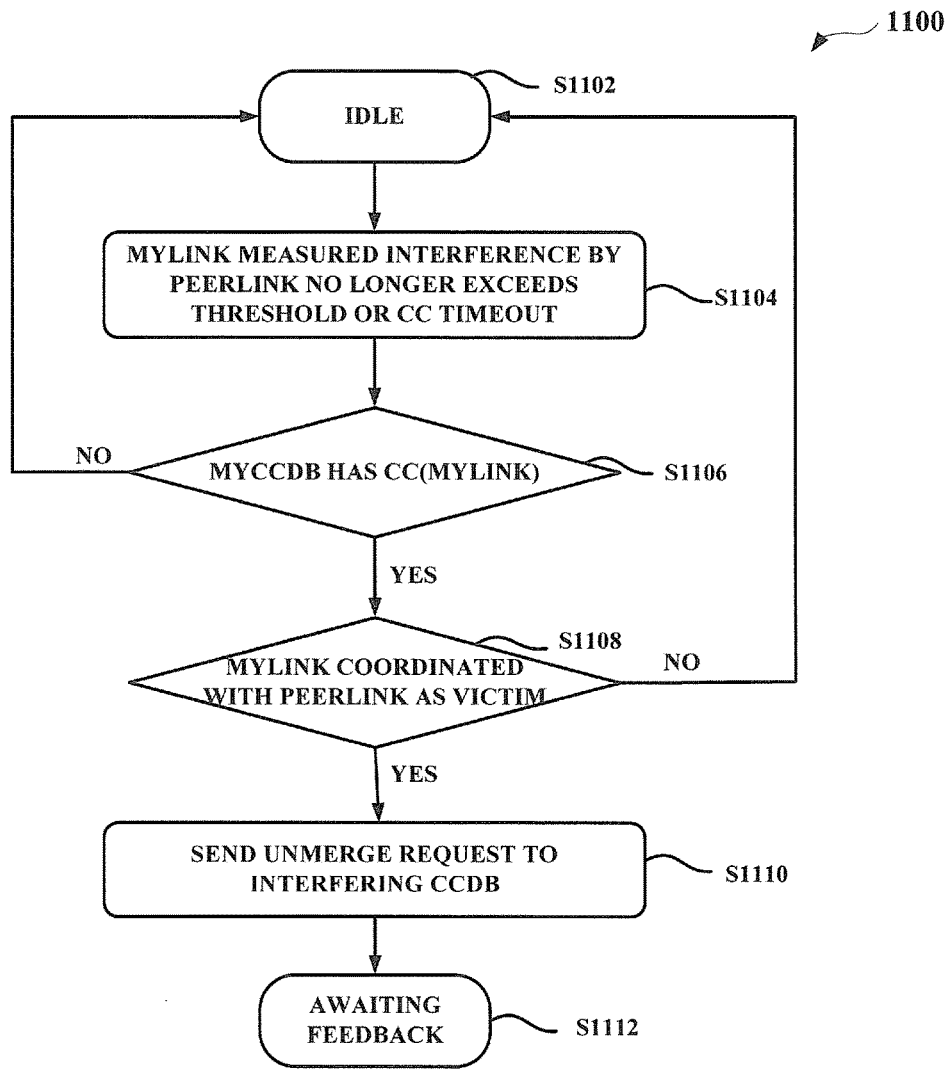
FIG. 11 is a schematic flowchart of a process for removing a no-longer-needed coordination context according to an embodiment of the present disclosure.

FIG. 11 is a schematic flowchart of a process 1100 for removing a no-longer-needed CC (i.e., resource coordination) according to an embodiment of the present disclosure. As illustrated in FIG. 11, at step S1102, the interfered node may be in an idle state in which a resource coordination procedure has been completed and determined schedulable resources have been used for a while. Then at step S1104, the interfered node measures the interference from the interfering node and finds that the interfering link is no long present or the currently-used CC has becomes invalid or timeout occurs. Then, at step S1106, the previously-interfered node determines whether a CC associated with the link, which was interfered but is not interfered now, exist in its own CCDB.

If the answer is "NO," then the flow goes back to step S1102. Otherwise, the flow proceeds to step S1108, at which the interfered node determines whether the link at issue would coordinate with other UDNs as interfered parties. If there is no need to coordinate with other UDNs, then the flow also loops back to the step S1102. However, if the local CC has been designed to protect other UDNs from interference, then the answer at the step S1108 would be "YES." Then, at step S1110, the previously-interfered node sends an unmerge request (i.e., a coordinated resource release message as mentioned before) to the CCDB of the previously-interfering node to remove the relevant CC from the constraints that the previously-interfering node may have. After that, at step S1112, the previously-interfered node awaits a feedback from the previously-interfering node.

Figure 12:
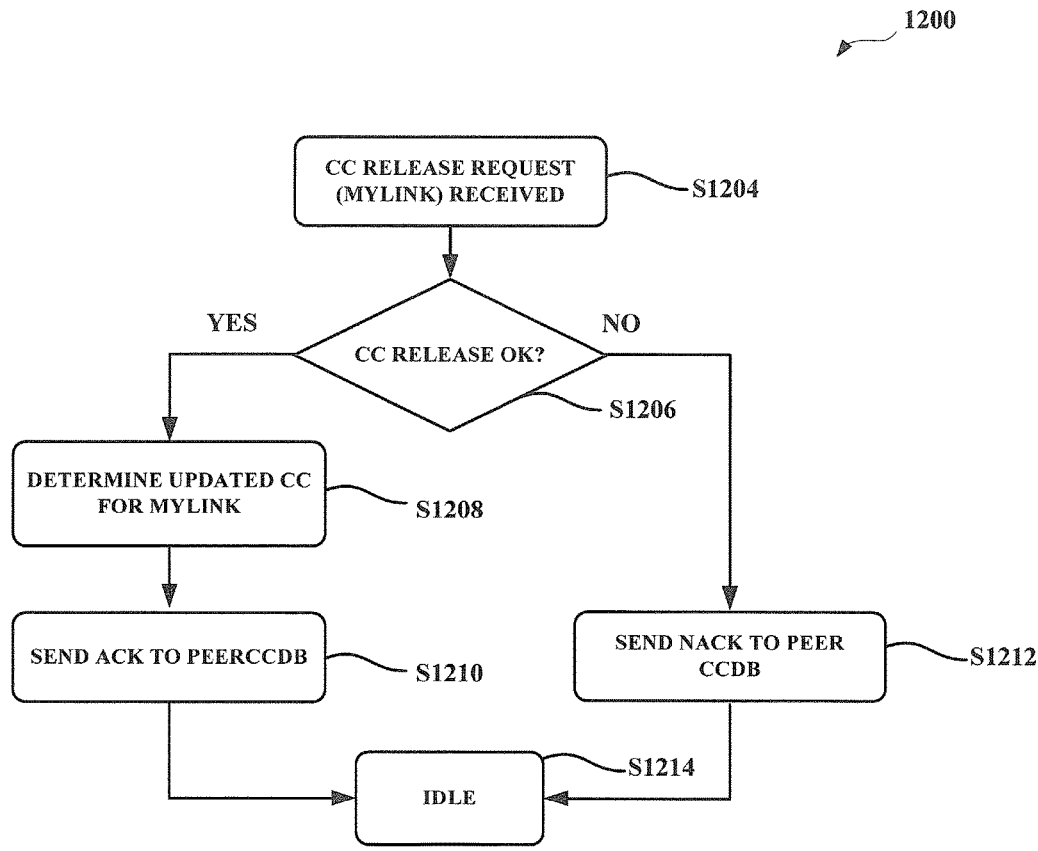
FIG. 12 is a schematic flowchart of a process for coordination context release according to an embodiment of the present disclosure.

FIG. 12 is a schematic flowchart of a process 1200 for CC release according to an embodiment of the present disclosure. As illustrated in FIG. 12, at step S1204, the previously-interfering node in the process 1100 receives the CC release request (i.e., the unmerge request) regarding the previously-interfered and previously-interfering wireless links. At step S1206, the previously-interfering node determines whether the CC release is acceptable. If this is the case, then at step S1208, the previously-interfering node determines an updated CC for the previously-interfering link, and at step S1210, sends an ACK to the CCDB of the previously-interfered node. If this is not the case, then the previously-interfering node simply sends a NACK to the CCDB of the previously-interfered node at step S1212. After all this, the process 1200 enters into the idle state at step S1214, i.e., resource coordination procedure at the previously-interfering node is over.

It may be understood from the above description that the process 1200 may take place when a wireless network is coordinated with requests for releasing the CC from a peer wireless network that intends to notify the wireless network that it does not need the corresponding coordination any longer. Then the wireless network checks if it agrees with this request, based on, e.g., whether the interference in one direction has disappeared but still exists in the other direction. If the request has been agreed upon, then an ACK is sent to the peer wireless network; otherwise, a NACK is sent to the peer wireless network.

Figure 13:
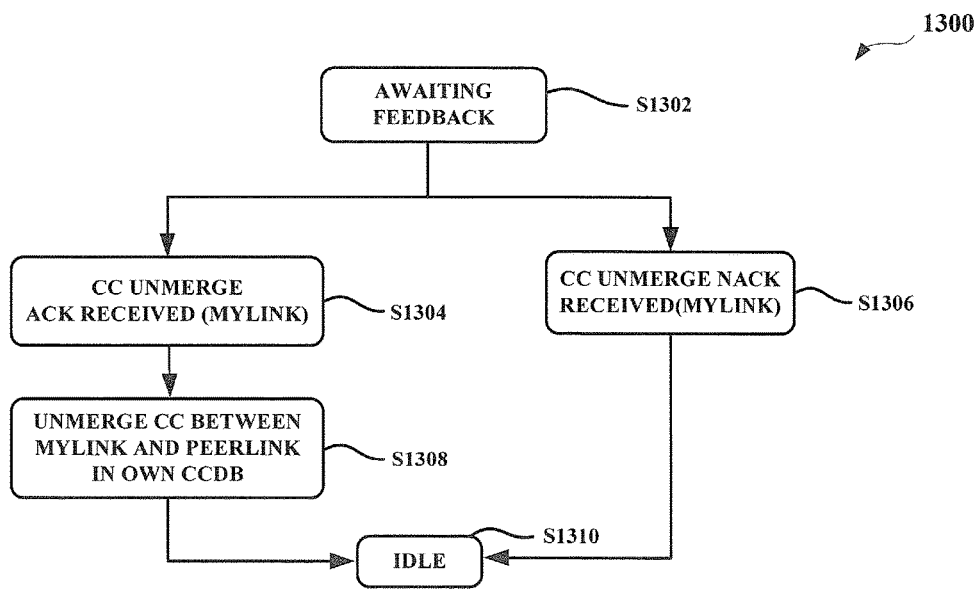
FIG. 13 is a schematic flowchart of a process for responding to a previously sent coordination context release message according to an embodiment of the present disclosure.

FIG. 13 is a schematic flowchart of a process 1300 for responding to a previously sent CC release message according to an embodiment of the present disclosure. As illustrated in FIG. 13, after awaiting the feedback from the previously-interfering node at step S1302, at step S1304, the previously-interfered node receives the ACK sent at step S1210 in FIG. 12 and then unmerges the CC associated with the interfering wireless link and the interfered wireless link in its own CCDB at step S1308. After that, the resource coordination procedure is over at step S1310. If the NACK sent at step S1212 is received at step S1306, then the previously-interfered node will unmerge nothing and also ends its operation at step S1310. It can be seen that the previously-interfered node may either release the CC or keeps it in the CCDB based on whether the ACK or NACK is received.

The foregoing has described the resource coordination procedure with reference to FIGS. 7-13 according to the embodiments of the present disclosure. It should be noted that the steps and step sequences as illustrated in these drawings are only one or more possible implementations of the embodiments of the present disclosure and a person skilled in the art may, under the teaching of the present disclosure, change, modify or adapt these steps so as to implement the resource coordination procedure. Therefore, the steps as illustrated are not intended to be taken to limit the scope of the present disclosure in any way.

Figure 14:
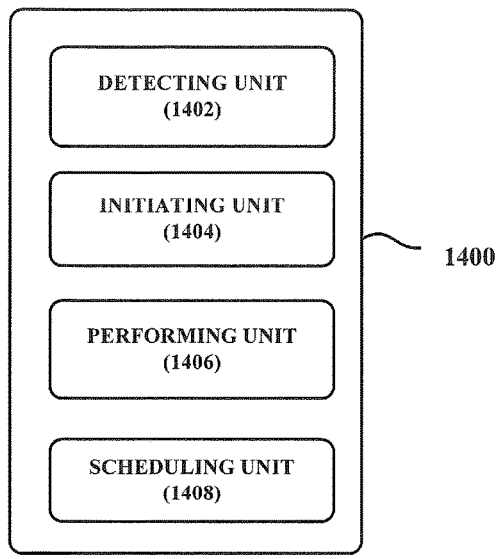
FIG. 14 is a schematic block diagram depicting an apparatus for coordinating resource scheduling according to an embodiment of the present disclosure.

FIG. 14 is a schematic block diagram depicting an apparatus 1400 for coordinating resource scheduling according to an embodiment of the present disclosure. As illustrated in FIG. 14, the apparatus 1400 comprises a detecting unit 1402 configured to detect whether interference on at least one interfered wireless link in a wireless network caused by at least one interfering wireless link in at least one second wireless network exceeds a pre-determined threshold. The apparatus 1400 also comprises an initiating unit 1404 configured to initiate a resource coordination procedure with the at least one second wireless network by transmitting a resource coordination message to the at least one second wireless network when the interference exceeds the pre-determined threshold. The apparatus 1400 further comprises a performing unit 1406 configured to perform, based on the resource coordination message, the resource coordination procedure with the at least one second wireless network to determine schedulable resources. The apparatus 1400 additionally comprises a scheduling unit 1408 configured to schedule the at least one interfered wireless link based on the determined schedulable resources.

Although not illustrated, in one embodiment, the performing unit 1406 is further configured to receive from the at least one second wireless network a response to the resource coordination message, wherein the response includes one of an ACK, a NACK and an update to the determined schedulable resources and transmit an updated resource coordination message to the at least one second wireless network when the response includes one of the NACK and the update. As an alternative, the performing unit 1406 may be configured to transmit to the at least one second wireless network an ACK message to the response.

In another embodiment, the performing unit 1406 is further configured to transmit, when the interference falls below the pre-determined threshold or does no longer occur for a pre-determined period of time, or the determined schedulable resources become invalid, to the at least one second wireless network a coordinated resource release message to release the coordinated resources or an updated resource coordination message to update at least some of the coordinated resources.

Figure 15:
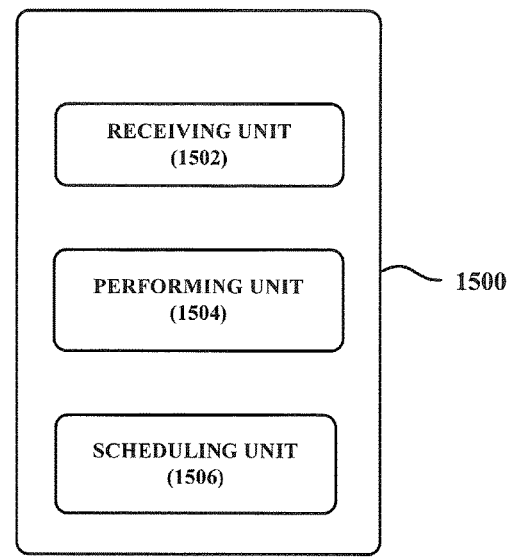
FIG. 15 is a schematic block diagram depicting an apparatus for coordinating resource scheduling according to another embodiment of the present disclosure.

FIG. 15 is a schematic block diagram depicting an apparatus 1500 for coordinating resource scheduling according to another embodiment of the present disclosure. As illustrated in FIG. 15, the apparatus 1500 comprises a receiving unit 1502 configured to receive a resource coordination message to initiate a resource coordination procedure with at least one second wireless network, wherein the resource coordination message is transmitted from the at least one second wireless network upon detecting that interference caused by at least one interfering wireless link in the wireless network on at least one interfered wireless link in the at least one second wireless network exceeds a pre-determined threshold. The apparatus 1500 also comprises a performing unit 1504 configured to perform, based on the resource coordination message, the resource coordination procedure with the at least one second wireless network to determine schedulable resources. The apparatus 1500 further comprises a scheduling unit 1506 configured to schedule the at least one interfering wireless link based on the determined schedulable resources.

Although not illustrated, in one embodiment, the performing unit 1504 is further configured to transmit to the at least one second wireless network a response to the resource coordination message, wherein the response includes one of an ACK, a NACK and an update to the schedulable resources, and the receiving unit 1502 is configured to receive an updated resource coordination message from the at least one second wireless network when the response includes one of the NACK and the update or configured to receive from the at least one second wireless network an ACK message to the response.

In another embodiment, the receiving unit 1502 is further configured to receive, when the interference falls below the pre-determined threshold or does no longer occur for a pre-determined period of time, or the determined schedulable resources become invalid, from the at least one second wireless network, a coordinated resource release message to release the coordinated resources or an updated resource coordination message to update at least some of the coordinated resources.

It is to be understood that the apparatuses 1400 and 1500 are capable of performing the methods 400 and 500 respectively and also capable of performing the processes as illustrated in FIGS. 7-13 in a coordinated manner such that schedulable radio resources could be determined.

Figure 16:
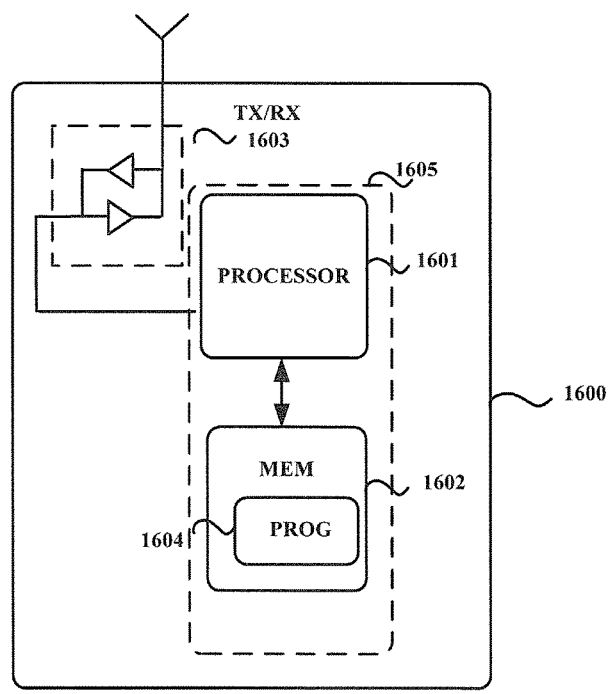
FIG. 16 is a schematic block diagram depicting an apparatus for coordinating resource scheduling according to embodiments of the present disclosure.

FIG. 16 is a schematic block diagram depicting an apparatus 1600 for coordinating resource scheduling according to embodiments of the present disclosure. As illustrated in FIG. 16, the apparatus 1600 includes at least one processor 1601, such as a data processor, at least one memory (MEM) 1602 coupled to the processor 1601, and a suitable RF transmitter TX and receiver RX 1603 coupled to the processor 1601. The MEM 1602 stores a program (PROG) 1604. A combination of the processor 1601 and the memory 1602 forms processing means 1605 as depicted in the dashed line. The TX/RX 1603 is for bidirectional wireless communications, such as those shown in FIG. 1. The apparatus 1600 may be coupled via a data path to one or more external networks or systems, such as the internet, for example.

The PROG 1604 is assumed to include instructions that, when executed by the processor 1601, enable the apparatus 1600 to operate in accordance with the exemplary embodiments of the present disclosure, as discussed herein with the methods 400 and 500, and processes 700-1300.

In general, the embodiments of the present disclosure may be implemented by computer software executable by at least one processor 1601 of the apparatus 1600, or by hardware, or by a combination of software and hardware.

The MEM 1602 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 1600, there may be several physically distinct memory units in the apparatus

1600. The processor 1601 may be of any type suitable to the local technical environment, and may include one or more of general purpose computers, special purpose computers, microprocessors, digital signal processors (DSPs) and processors based on multicore processor architecture, as non limiting examples. The apparatus 1600 may have multiple processors, such as for example an application specific integrated circuit chip that is slaved in time to a clock which synchronizes the main processor.

According to the above descriptions, the present disclosure proposes an apparatus for coordinating resource scheduling between two or more wireless networks which operate on same or overlapping radio resources, wherein each wireless network comprises one or more radio access nodes and one or more terminal devices connected thereto. The apparatus comprises at least one processor and at least one memory including computer program code, wherein the at least one memory and the computer program code are configured to, with the at least one processor, cause the apparatus at least to detect whether interference on at least one interfered wireless link in the wireless network caused by at least one interfering wireless link in at least one second wireless network exceeds a pre-determined threshold; initiate a resource coordination procedure with the at least one second wireless network by transmitting a resource coordination message to the at least one second wireless network when the interference exceeds the pre-determined threshold; perform, based on the resource coordination message, the resource coordination procedure with the at least one second wireless network to determine schedulable resources; and schedule the at least one interfered wireless link based on the determined schedulable resources.

The present disclosure also proposes an apparatus for coordinating resource scheduling between two or more wireless networks which operate on same or overlapping radio resources, wherein each wireless network comprises one or more radio access nodes and one or more terminal devices connected thereto. The apparatus comprises at least one processor and at least one memory including computer program code, wherein the at least one memory and the computer program code are configured to, with the at least one processor, cause the apparatus at least to: receive a resource coordination message to initiate a resource coordination procedure with at least one second wireless network, wherein the resource coordination message is transmitted from the at least one second wireless network upon detecting that interference caused by at least one interfering wireless link in the wireless network on at least one interfered wireless link in the at least one second wireless network exceeds a pre-determined threshold; perform, based on the resource coordination message, the resource coordination procedure with the at least one second wireless network to determine schedulable resources; and schedule the at least one interfering wireless link based on the determined schedulable resources.

The present disclosure further proposes an apparatus for coordinating resource scheduling between two or more wireless networks which operate on same or overlapping radio resources, wherein each wireless network comprises one or more radio access nodes and one or more terminal devices connected thereto, the apparatus comprising processing means adapted to detect whether interference on at least one interfered wireless link in the wireless network caused by at least one interfering wireless link in at least one second wireless network exceeds a pre-determined threshold; initiate a resource coordination procedure with the at least one second wireless network by transmitting a resource coordination message to the at least one second wireless network when the interference exceeds the pre-determined threshold; perform, based on the resource coordination message, the resource coordination procedure with the at least one second wireless network to determine schedulable resources; and schedule the at least one interfered wireless link based on the determined schedulable resources. In an embodiment, the processing means herein comprise a processor and a memory and wherein the memory contains instructions executable by the processor.

The present disclosure additionally proposes an apparatus for coordinating resource scheduling between two or more wireless networks which operate on same or overlapping radio resources, wherein each wireless network comprises one or more radio access nodes and one or more terminal devices connected thereto, the apparatus comprising processing means adapted to: receive a resource coordination message to initiate a resource coordination procedure with at least one second wireless network, wherein the resource coordination message is transmitted from the at least one second wireless network upon detecting that interference caused by at least one interfering wireless link in the wireless network on at least one interfered wireless link in the at least one second wireless network exceeds a pre-determined threshold; perform, based on the resource coordination message, the resource coordination procedure with the at least one second wireless network to determine schedulable resources; and schedule the at least one interfering wireless link based on the determined schedulable resources. In an embodiment, the processing means herein comprise a processor and a memory and wherein the memory contains instructions executable by the processor.

Each apparatus as proposed above could be embodied as the apparatus 1600 discussed with reference to FIG. 16, and therefore the at least one processor, the at least one memory, and computer program code could be equally embodied as the processor 1601, memory 1602 and program 1604, respectively.

Further, according to different implementation manners, the present disclosure also provides a computer program, comprising instructions which, when executed on at least one processor, e.g., the processor 1601, cause the at least one processor to carry out the method according to any one of claims 1 to 10 as attached in the following claims.

In addition, the present disclosure provides a carrier containing the computer program as mentioned above, wherein the carrier is one of an electronic signal, optical signal, radio signal, or computer readable storage medium.

The techniques described herein may be implemented by various means so that an device implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be through modules (e.g., procedures, functions, and so on) that perform the functions described herein.

Many modifications and other embodiments of the disclosure set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for use in a wireless network for coordinating resource scheduling between two or more wireless networks which operate on same or overlapping radio resources, wherein each wireless network comprises one or more radio access nodes and one or more terminal devices connected thereto, the method comprising:
   detecting whether interference on at least one interfered wireless link in the wireless network caused by at least one interfering wireless link in at least one second wireless network exceeds a pre-determined threshold;
   initiating a resource coordination procedure with the at least one second wireless network by transmitting a resource coordination message to the at least one second wireless network when the interference exceeds the pre-determined threshold;
   performing, based on the resource coordination message, the resource coordination procedure with the at least one second wireless network to determine schedulable resources; and
   scheduling the at least one interfered wireless link based on the determined schedulable resources.

2. The method according to claim 1, wherein the resource coordination message indicates which radio resources are schedulable to the at least one interfered wireless link and the at least one interfering wireless link and wherein the radio resources schedulable to the at least one interfered wireless link and the radio resources schedulable to the at least one interfering wireless link are at least partially orthogonal to each other.

3. The method according to claim 2, wherein the resource coordination message comprises a bit sequence in which each bit is indicative of whether a radio resource in at least one of a time domain, a frequency domain, a power domain, and a code domain is schedulable to the at least one interfered wireless link or schedulable to the at least one interfering wireless link.

4. The method according to claim 2, wherein the performing the resource coordination procedure with the at least one second wireless network comprises:
   receiving from the at least one second wireless network a response to the resource coordination message, wherein the response includes one of an acknowledgement, a negative acknowledgement and an update to the determined schedulable resources; and
   transmitting an updated resource coordination message to the at least one second wireless network when the response includes one of the negative acknowledgement and the update, or
   transmitting to the at least one second wireless network an acknowledgement message to the response.

5. The method according to claim 1, wherein the performing the resource coordination procedure with the at least one second wireless network comprises:
   transmitting, when the interference falls below the pre-determined threshold or does no longer occur for a pre-determined period of time, or the determined schedulable resources become invalid, to the at least one second wireless network a coordinated resource release message to release at least some of the coordinated resources or an updated resource coordination message to update at least some of the coordinated resources.

6. A method for use in a wireless network for coordinating resource scheduling between two or more wireless networks which operate on same or overlapping radio resources, wherein each wireless network comprises one or more radio access nodes and one or more terminal devices connected thereto, the method comprising:
   receiving a resource coordination message to initiate a resource coordination procedure with at least one second wireless network, wherein the resource coordination message is received from the at least one second wireless network when interference caused by at least one interfering wireless link in the wireless network on at least one interfered wireless link in the at least one second wireless network exceeds a pre-determined threshold;
   performing, based on the resource coordination message, the resource coordination procedure with the at least one second wireless network to determine schedulable resources; and
   scheduling the at least one interfering wireless link based on the determined schedulable resources.

7. The method according to claim 6, wherein the resource coordination message indicates which radio resources are schedulable to the at least one interfered wireless link and the at least one interfering wireless link and wherein the radio resources schedulable to the at least one interfered wireless link and the radio resources schedulable to the at least one interfering wireless link are at least partially orthogonal to each other.

8. The method according to claim 7, wherein the resource coordination message comprises a bit sequence in which each bit is indicative of whether each radio resource in at least one of a time domain, a frequency domain, a power domain and a code domain is schedulable to the at least one interfered wireless link or schedulable to the at least one interfering wireless link.

9. The method according to claim 6, wherein the performing the resource coordination procedure with the at least one second wireless network comprises:
   transmitting to the at least one second wireless network a response to the resource coordination message, wherein the response includes one of an acknowledgement, a negative acknowledgement and an update to the schedulable resources; and
   receiving an updated resource coordination message from the at least one second wireless network when the response includes one of the negative acknowledgement and the update, or
   receiving from the at least one second wireless network an acknowledgement message to the response.

10. The method according to claim 6, wherein the performing the resource coordination procedure with the at least one second wireless network comprises:
    receiving, when the interference falls below the pre-determined threshold or does no longer occur for a pre-determined period of time, or the determined schedulable resources become invalid, from the at least one second wireless network, a coordinated resource release message to release the coordinated resources or an updated resource coordination message to update at least some of the coordinated resources.

11. An apparatus for coordinating resource scheduling between two or more wireless networks which operate on same or overlapping radio resources, wherein each wireless network comprises one or more radio access nodes and one or more terminal devices connected thereto, the apparatus comprising:
- at least one processor;
- at least one memory including computer program code,
- wherein the at least one memory and the computer program code are configured to, with the at least one processor, cause the apparatus at least to:
  - detect whether interference on at least one interfered wireless link in a wireless network caused by at least one interfering wireless link in at least one second wireless network exceeds a pre-determined threshold;
  - initiate a resource coordination procedure with the at least one second wireless network by transmitting a resource coordination message to the at least one second wireless network when the interference exceeds the pre-determined threshold;
  - perform, based on the resource coordination message, the resource coordination procedure with the at least one second wireless network to determine schedulable resources; and
  - schedule the at least one interfered wireless link based on the determined schedulable resources.

12. The apparatus according to claim 11, wherein the resource coordination message indicates which radio resources are schedulable to at least one of the at least one interfered wireless link and the at least one interfering wireless link and wherein the radio resources schedulable to the at least one interfered wireless link and the radio resources schedulable to the at least one interfering wireless link are at least partially orthogonal to each other.

13. The apparatus according to claim 12, wherein the resource coordination message comprises a bit sequence in which each bit is indicative of whether each radio resource in at least one of a time domain, a frequency domain, a power domain and a code domain is schedulable to the at least one interfered wireless link or schedulable to the at least one interfering wireless link.

14. The apparatus according to claim 12, wherein the at least one memory and the computer program code are further configured to, with the at least one processor, cause the apparatus to:
- receive from the at least one second wireless network a response to the resource coordination message, wherein the response includes one of an acknowledgement, a negative acknowledgement and an update to the determined schedulable resources; and
- transmit an updated resource coordination message to the at least one second wireless network when the response includes one of the negative acknowledgement and the update; or
- transmit to the at least one second wireless network an acknowledgement message to the response.

15. The apparatus according to claim 11, wherein the at least one memory and the computer program code are further configured to, with the at least one processor, cause the apparatus to transmit, when the interference falls below the pre-determined threshold or does no longer occur for a pre-determined period of time, or the determined schedulable resources become invalid, to the at least one second wireless network a coordinated resource release message to release the coordinated resources or an updated resource coordination message to update at least some of the coordinated resources.

16. An apparatus for coordinating resource scheduling between two or more wireless networks which operate on same or overlapping radio resources, wherein each wireless network comprises one or more radio access nodes and one or more terminal devices connected thereto, the apparatus comprising:
- at least one processor;
- at least one memory including computer program code,
- wherein the at least one memory and the computer program code are configured to, with the at least one processor, cause the apparatus at least to:
  - receive a resource coordination message to initiate a resource coordination procedure with at least one second wireless network, wherein the resource coordination message is received from the at least one second wireless network when interference caused by at least one interfering wireless link in the wireless network on at least one interfered wireless link in the at least one second wireless network exceeds a pre-determined threshold;
  - perform, based on the resource coordination message, the resource coordination procedure with the at least one second wireless network to determine schedulable resources; and
  - schedule the at least one interfering wireless link based on the determined schedulable resources.

17. The apparatus according to claim 16, wherein the resource coordination message indicates which radio resources are schedulable to at least one of the at least one interfered wireless link and the at least one interfering wireless link and wherein the radio resources schedulable to the at least one interfered wireless link and the radio resources schedulable to the at least one interfering wireless link are at least partially orthogonal to each other.

18. The apparatus according to claim 17, wherein the resource coordination message comprises a bit sequence in which each bit is indicative of whether each radio resource in at least one of a time domain, a frequency domain, a power domain and a code domain is schedulable to the at least one interfered wireless link or schedulable to the at least one interfering wireless link.

19. The apparatus according to claim 16, wherein the at least one memory and the computer program code are further configured to, with the at least one processor, cause the apparatus to:
- transmit to the at least one second wireless network a response to the resource coordination message, wherein the response includes one of an acknowledgement, a negative acknowledgement and an update to the schedulable resources; and
- receive an updated resource coordination message from the at least one second wireless network when the response includes one of the negative acknowledgement and the update or receive from the at least one second wireless network an acknowledgement message to the response.

20. The apparatus according to claim 16, wherein the at least one memory and the computer program code are further configured to, with the at least one processor, cause the apparatus to:
- receive, when the interference falls below the pre-determined threshold or does no longer occur for a pre-determined period of time, or the determined schedulable resources become invalid, from the at least one second wireless network, a coordinated resource release message to release the coordinated resources or an updated resource coordination message to update at least some of the coordinated resources.

* * * * *